Sept. 10, 1963 J. AVINS ET AL 3,103,554

INTERSTAGE NETWORK USING CANCELLATION TRAP AS EFFECTIVELY UNTUNED COUPLING BETWEEN RESONANT CIRCUITS

Filed Oct. 19, 1955 3 Sheets-Sheet 1

INVENTORS
Jack Avins
& Benjamin Fisher
BY
[signature]
ATTORNEY

INVENTORS
Jack Avins
& Benjamin Fisher
BY
[signature]
ATTORNEY

Sept. 10, 1963 J. AVINS ET AL 3,103,554

INTERSTAGE NETWORK USING CANCELLATION TRAP AS EFFECTIVELY UNTUNED COUPLING BETWEEN RESONANT CIRCUITS

Filed Oct. 19, 1955 3 Sheets-Sheet 3

INVENTORS
Jack Avins
& Benjamin Fisher
BY
[signature]
ATTORNEY

United States Patent Office 3,103,554

Patented Sept. 10, 1963

3,103,554

INTERSTAGE NETWORK USING CANCELLATION TRAP AS EFFECTIVELY UNTUNED COUPLING BETWEEN RESONANT CIRCUITS

Jack Avins, New York, and Benjamin Fisher, Forest Hills, N.Y., assignors to Radio Corporation of America, a corporation of Delaware Filed Oct. 19, 1955, Ser. No. 541,363

3 Claims. (Cl. 178—5.8)

This invention relates generally to signal transfer apparatus, and more particularly to novel coupling networks comprising bandpass networks and trap or rejection circuits, and to intermediate frequency amplifiers for monochrome and color television receivers utilizing such coupling networks.

In television receivers generally, it is requisite that provision be made for the rejection or substantial attenuation of certain undesired signals such as the so-called adjacent channel sound carrier and the adjacent channel picture carrier. An additional "undesired" signal so far as the receiver's video circuitry is concerned, and for which substantial relative attenuation must be provided, is the accompanying sound carrier. In color television receivers, adapted to operate on a standard composite color picture signal wherein chrominance information appears as the sidebands of a color subcarrier of approximately 3.58 mc., the problem of rejection of the accompanying sound carrier is particularly acute. The upper sideband of the color subcarrier necessarily extends close to the accompanying sound components in the frequency spectrum of a received composite color picture signal. Use of conventional trap circuits for attenuation of the accompanying sound carrier is likely to result in series phase distortion of the subcarrier sideband components in the vicinity thereof. A characteristic in which response is maintained relatively high for the upper sideband components and then drops off rapidly to a response of a substantially low level for the accompanying sound carrier is however required if both adequate chrominance signal response and substantial sound carrier attenuation are to be satisfactorily effected. It will also be recognized that failure to properly attenuate the accompanying sound carrier in a color receiver will result in the presence of an objectionable beat of approximately 920 kc. (the difference between the 3.58 mc. color subcarrier and the 4.5 mc. intercarrier beat) in the receiver's video circuitry. An interfering signal of this frequency cannot be conveniently trapped out in the video circuits.

It is an object of the present invention to provide color television intermediate frequency amplifiers, and coupling networks for use therein, whereby the bandpass and rejection characteristics required by the above-discussed features can be achieved with minimum phase distortion of the chrominance signal components. It will of course be appreciated that while such amplifiers and networks are of particular importance in color television, they may also be used to advantage in other applications, e.g. in monochrome television receivers.

The present invention achieves the aforesaid object through the provision of coupling networks wherein a circuit of the so-called "bifilar-T" trap type is employed as a low side coupling element between primary and secondary single tuned circuits. Reference may be made to the co-pending application of Morris D. Nelson, Ser. No. 424,004, filed April 19, 1954, now Patent No. 3,029,-400, and entitled "Signal Transfer Apparatus"; to the co-pending application of Jack Avins, Ser. No. 455,826, filed September 14, 1954 and entitled "Signal Transfer Apparatus"; and to the article by Jack Avins entitled "The Design of IF Amplifiers for Color Television Receivers," appearing in the July 1954 issue of the Transactions of the IRE Professional Group on Broadcast and Television Receivers; for disclosures of, and discussions of, circuits of the aforesaid bifilar-T trap type. A particularly desirable characteristic of the novel networks of the present invention, wherein a low impedance bifilar-T type trap circuit is used as the coupling element between respective tuned circuits, is that there is no interdependance of the various tuned elements, i.e. there is substantially no intersection between the tuning of the primary and secondary tuned circuits, and the trap. The impedance level of the bifilar-T type trap circuit determines the relative coupling of the primary and secondary which may be adjusted so that the primary and secondary are stagger-tuned to opposite ends of the IF passband. With this adjustment, spot frequency alignment is readily feasible.

A variety of embodiments of the present invention is disclosed herein, whereby particular features, such as D.-C. isolation of the primary and secondary circuits, and trapping at both ends of the IF passband, may be provided.

A general object of the present invention is to provide novel and improved networks having desirable bandpass and rejection characteristics.

Another object of the present invention is to provide a novel color television IF amplifier wherein an optimum amplitude response characteristic may be provided for the received composite color picture signals with minimum disturbance of signal phase.

Other objects and advantages of the present invention will be apparent to those skilled in the art after a reading of the following detailed description and an inspection of the accompanying drawings in which.

Figures 1, 2, 3, 4:
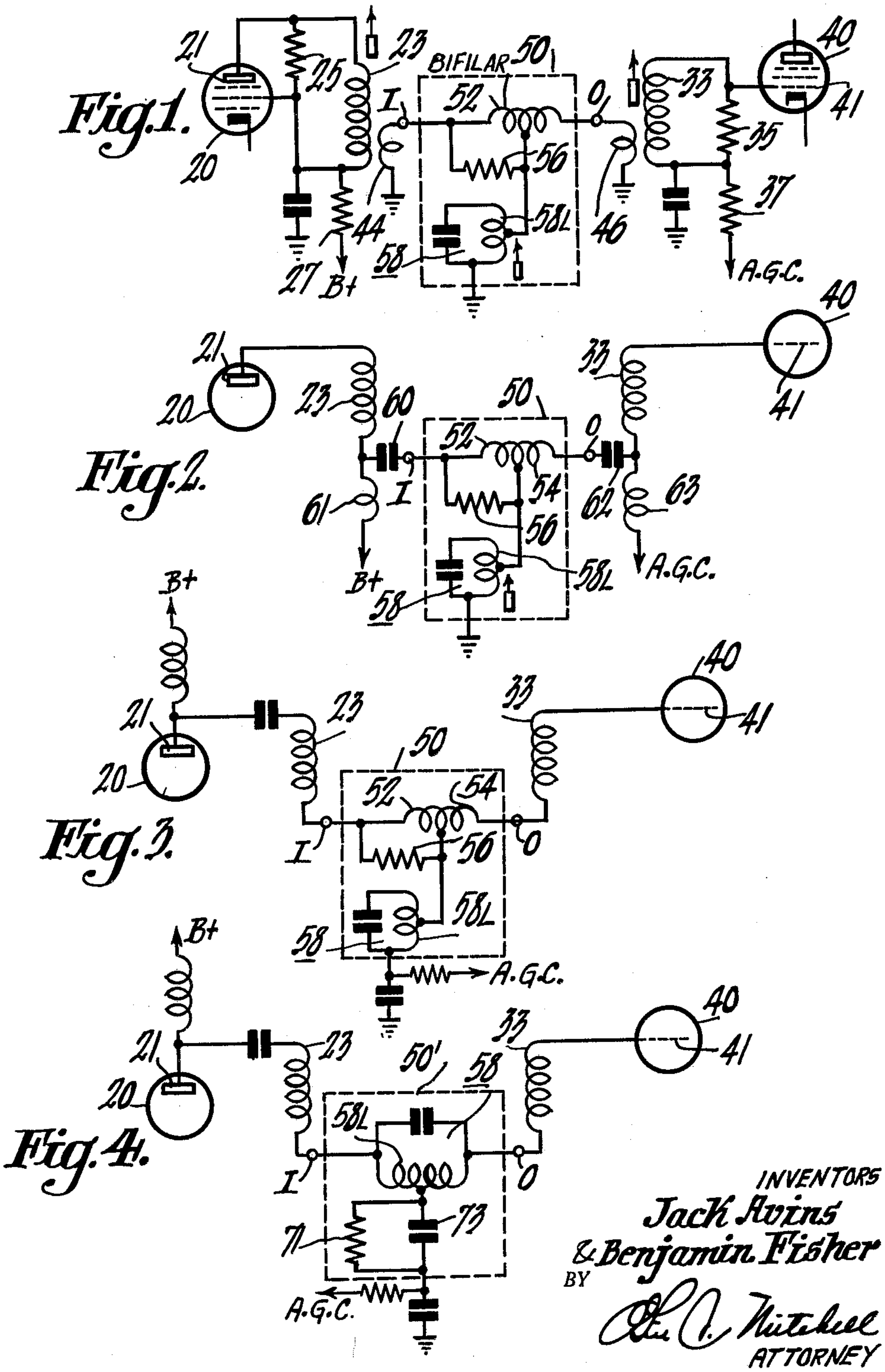
FIGURE 1 illustrates schematically an interstage coupling network embodying the principles of the present invention.
FIGURES 2, 3, 4 and 5 illustrate schematically various modifications of the interstage coupling network of FIGURE 1 in accordance with further embodiments of the present invention.

Referring more specifically to FIGURE 1, the coupling network between the output electrode 21 of a first amplifier tube 20 and the input electrode 41 of a second amplifier tube 50 is illustrated. The respective amplifier tubes 20 and 40 may, for example, comprise successive stages of a television receiver intermediate frequency amplifier. The output electrode 21 is connected to a point of B+ potential by means of an inductor 23, shunted by a damping resistor 25, in series with the resistor 27. The input electrode 41 is connected to a source of AGC potential by means of an inductor 33, shunted by a damping resistor 35, in series with a resistor 37. The inductors 23 and 33, which shall hereinafter be referred to as the primary winding and secondary winding, respectively, are provided with suitable tuning means, such as means of the schematically indicated tuning slug variety, to permit adjustment of the resonance of each with its respectively associated shunt capacities.

There is no mutual inductive coupling between the primary and secondary windings 23 and 33. Rather, a coupling network 50, of the so-called bifilar-T trap type, is employed as the coupling element between primary and secondary windings, link coil 44 closely coupled to the primary winding 23 transferring signals therefrom to the input terminal "I" of the bifilar-T network 50, and link coil 46 closely coupled to the secondary winding 33 transferring signals thereto from the output terminal "O" of the bifilar-T network 50.

The network 50 includes a pair of mutually inductively coupled windings 52 and 54, desirably but not necessarily bifilar wound. The sign of the mutual coupling between windings 52 and 54 is indicated on the drawing as negative. In other words, the transfer of signals from the input link coil end of winding 52 to the output link coil end of winding 54 via mutual coupling is accompanied by a phase reversal. The input winding 52 is shunted by a bridging resistance 56. The common intermediate terminal of windings 52 and 54 is connected to a tapping point on the inductance element 58L of a parallel resonant circuit 58, one end of which is connected to a point of reference potential (e.g. in the illustrative embodiment, a point of ground potential). The parallel resonant circuit 58 is provided with suitable tuning means, such as means of the schematically indicated tuning slug variety. A typical response characteristic for the interstage coupling network of FIGURE 1 is illustrated graphically in FIGURE 7, the dotted-line curves "*s*" and "*p*" representing the individual response characteristics of the tuned secondary and primary windings, respectively.

FIGURE 2 illustrates a modification of the network of FIGURE 1 in which link coil coupling of the network 50 to the primary and secondary windings 23 and 33 is not employed. Instead, the input terminal "I" of network 50 is connected via a blocking capacitor 60 to the end of primary winding 23 remote from the output electrode 21; the output terminal "O" of network 50 is similarly connected via a blocking capacitor 62 to the end of the secondary winding 33 remote from the input electrode 41. Respective primary and secondary terminating inductors 61 and 63 are provided, the primary terminating inductor 61 being connected between input terminal "I" and a source of B+ potential, and the secondary terminating inductor 63 being connected between output terminal "O" and a source of AGC potential.

It will be appreciated that the use of the closely coupled link coils in the embodiment of FIGURE 1 and the use of the terminating inductors in the embodiment of FIGURE 2 have substantially equivalent effects with respect to the coupling of the network 50 to the primary and secondary windings 23 and 33. Use of the link coil coupling, of course, possesses the advantage of D.C. isolation of the coupled circuits without need for the use of blocking condensers. The impedance level of the trap network 50, in the one case determined by the inductance value of the link coils 44 and 46, and in the other case by the inductance value of the terminating inductors 61 and 63, determines the relative coupling of the primary and secondary windings. The inductance value of these elements may be precisely adjusted to compensate for tilts in the transmission band. It will of course be appreciated that as an alternative to the use of terminating inductors 61 and 63 or link coils 43 and 46, direct coupling of a primary and secondary winding 23 and 33 by the network 50 without provision for low side termination may be effected, as illustrated by the coupling network of FIGURE 3.

Figures 5, 6:
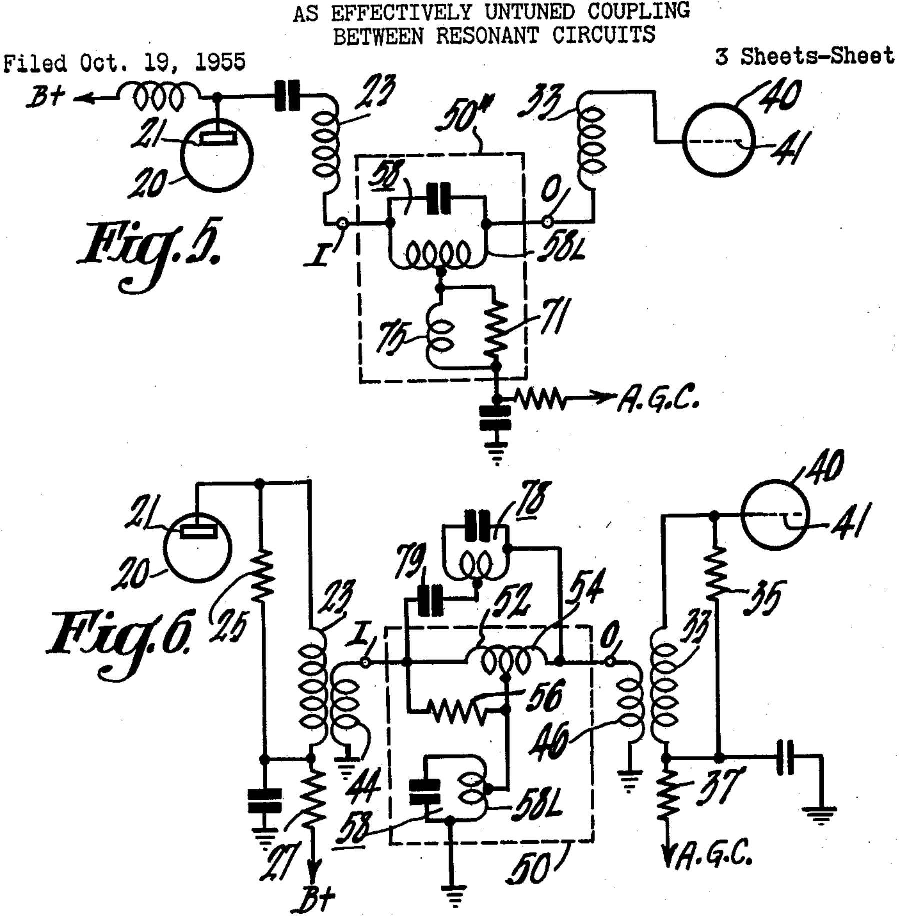
FIGURE 6 illustrates a further embodiment of the present invention which comprises a two-trap modification of the network of FIGURE 2.

Additional forms of the invention, wherein low side terminations are also omitted, are illustrated in FIGURES 4 and 5. It will be noted that in the arrangements of FIGURES 4 and 5 the parallel resonant circuit 58 is connected between the input terminal "I" and the output terminal "O" of the network 50, the inductance element 58L thereof occupying the position of the windings 52 and 54 in the previously discussed embodiments. In the embodiment of FIGURE 4, a tapping point on the inductance element 58L is returned to a point of reference potential by means of a parallel combination of a resistor 71 and a capacitor 73, whereas in the embodiment of FIGURE 5, an inductance 75 replaces the capacitor 73 of the FIGURE 4 embodiment.

Figure 7:
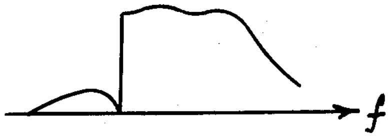
FIGURES 7, 8 and 9 illustrate graphically response characteristics associated with various ones of the aforesaid embodiments.
Figure 8:
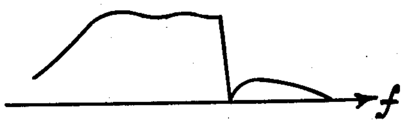

The alternative forms illustrated in FIGURES 4 and 5 may be distinguished in that the latter is appropriate for use in obtaining a response characteristic of the type shown in FIGURE 7, i.e. where trapping of an undesired signal frequency at the low frequency end of the passband is desired, whereas the former is appropriate for use in obtaining a response characteristic of the type shown in FIGURE 8, i.e. where trapping of an undesired signal frequency is desired at the high frequency end of the passband. In the embodiments of FIGURES 4 and 5, as well as the embodiment of FIGURE 3, wherein low side terminations are omitted, supply of operating potential to anode 21 is effected in accordance with a conventional shunt feed arrangement, while AGC potential is applied to control grid 41 via the "leg" of the T network.

Figure 9:
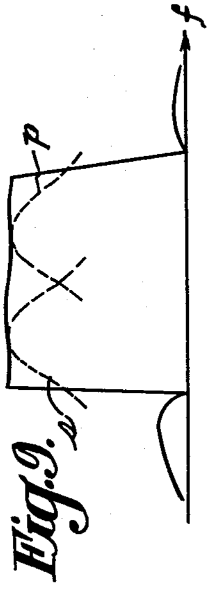

FIGURE 6 illustrates schematically a modification of the coupling network of FIGURE 1, the modification being desirable where it is sought to effect trapping at both ends of the passband, i.e. to achieve a frequency response characteristic such as illustrated graphically in FIGURE 9. In FIGURE 6, the network 50 is modified by the provision of an additional parallel resonant circuit 78, one end of which is connected to the output terminal "O" of the network. A tapping point on the inductance element 78L of the parallel resonant circuit 78 is coupled by means of a capacitor 79 to the input terminal "I" of the network 50.

With the schematic details of the present invention thus presented, it is now in order to consider the common, and distinguishing, features of the various embodiments with respect to principles of operation, performance, form of use, and respective advantages. A significant feature common to the various presented embodiments is that the bifilar-T type network is utilized as the coupling element between the respective tuned circuits of an interstage coupling network. In prior utilizations of the bifilar-T type network, the bifilar windings were tuned to determine or contribute to the bandpass response of the interstage network. In the various embodiments of the present invention the bifilar-T type network does not contribute to the bandpass selectivity of the interstage coupling, other than to effect the desired signal trapping at an edge or edges of the passband. Substantial independence of the bifilar-T trap tuning and the tuning of the associated tuned circuits of the interstage coupling is thus achieved.

It is not believed necessary to explain in detail the cancellation trapping principles of the bifilar-T trap circuit in view of adequate presentations of the underlying theory in the applications and article previously referred to. It may, however, briefly be noted that at the predetermined rejection frequency, in the vicinity of, and determined by, the frequency of tuning of the parallel resonant circuit 58, the signal transfer effected by inductive coupling within the network (i.e. via windings 52, 54 in the embodiments of FIGURES 1, 2, 3 and 6; via the windings of inductance element 58L in the embodiments of FIGURES 4 and 5) is effectively cancelled by the signal appearing across the leg of the network. In the more conventional bifilar-T trap form (as in the embodiments of FIGURES 1, 2, 3 and 6) the latter is the signal appearing between the tapping point of the inductance element of resonant circuit 58 and the A.C. ground terminal of the resonant circuit 58, while in the "inverted" forms of FIGURES 4 and 5, it is the signal appearing across the RC and RL combinations 71—73, and 71—75, respectively.

It will be appreciated that, in accordance with the tuning of the resonant circuit 58, the embodiments illustrated in FIGURES 1, 2 and 3 may be adapted to provide trapping at either the low frequency or the high frequency end of the passband. However, as previously noted, the embodiment of FIGURE 4 is particularly adapted to provision of trapping at the high frequency end of the passband, whereas the embodiment of FIGURE 5 is particularly adapted for provision of trapping at the low frequency end of the passband. The embodiment of FIGURE 6 permits achievement of trapping at both ends of the passband. The form taken by the trap elements 78—79 is particularly suited for tuning of this trap at the high frequency end of the passband; hence tuning of the resonant circuit 58 in the FIGURE 6 network, as illustrated, is to the low frequency end. However, it may be noted that where it is desired in the two-trap arrangement of FIGURE 6 to utilize resonant circuit 58 to achieve high-end trapping, the trap arrangement 78-79 may be simply adapted to low frequency end trapping by substituting an inductor for the capacitor 79.

Figure 10:
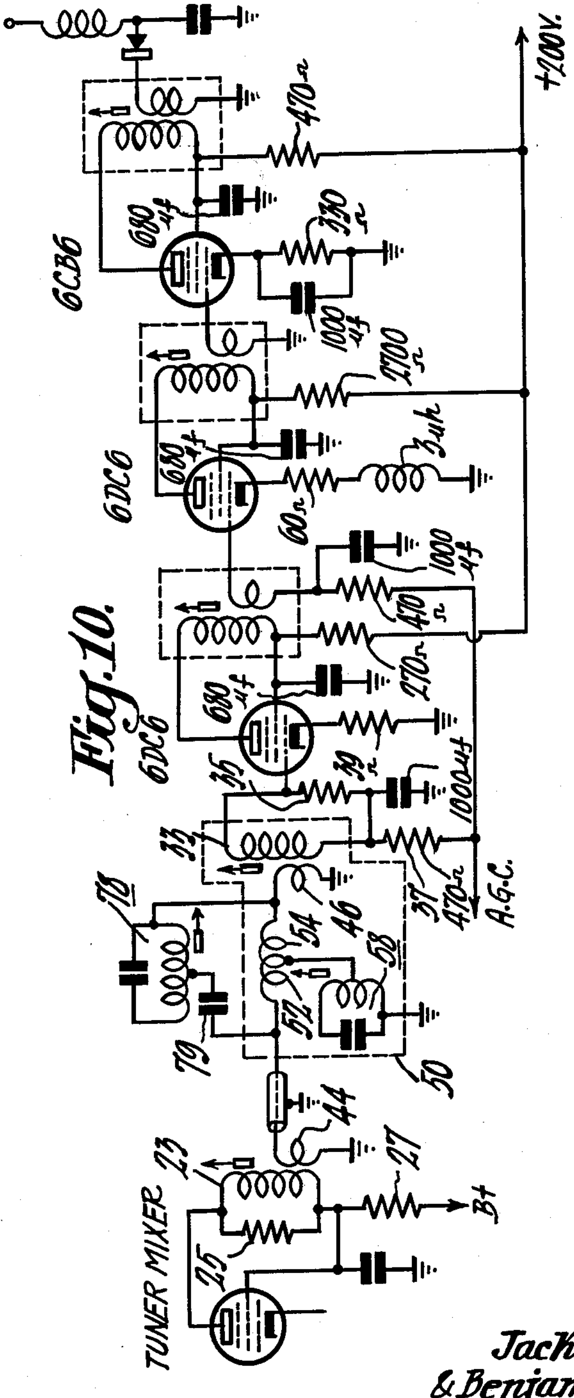
FIGURE 10 illustrates in schematic detail a color television receiver intermediate amplifier utilizing embodiments of the present invention.

A practical application of the principles of the present invention is illustrated in FIGURE 10, which shows in schematic detail a three-stage IF amplifier, coupling the mixer (partially illustrated) of a color television receiver's RF tuner to the receiver's second detector. It will be observed that the mixer-to-first IF coupling takes the form of the two-trap embodiment of the invention illustrated in FIGURE 6. Experimental results obtained with the IF channel of FIGURE 10 have indicated that the present invention provides a quite satisfactory solution to the problem of properly attenuating at intermediate frequencies such signals as the accompanying sound carrier and the adjacent channel sound carrier with minimum disturbance of signal phase in the IF passband.

Having thus described the invention, what is claimed is:

1. In a television receiver including a first electron discharge device having an output electrode, a second electron discharge device having an input electrode, said first electron discharge device developing intermediate signal frequencies at said output electrode in response to waves received by said receiver, said intermediate frequency signals including picture intermediate frequency signal components occupying a predetermined band of frequencies and a modulated sound carrier component, said sound carrier appearing at an intermediate frequency outside said predetermined band, a coupling network for coupling said output electrode to said input electrode, said coupling network comprising a first resonant circuit connected to said output electrode, a second resonant circuit connected to said input electrode, and a sound carrier trap circuit utilized to couple said first resonant circuit to said second resonant circuit, said sound carrier trap circuit comprising an input terminal coupled to said first resonant circuit, an output terminal coupled to said second resonant circuit, a pair of mutually inductively coupled windings connected in series between said input terminal and said output terminal, a parallel resonant circuit comprising an inductance element in shunt with a capacitance element, said inductance element having a plurality of terminals, means for connecting one of said inductance element terminals to a point of reference potential, and means for connecting another of said inductance element terminals to the point of common connection of said pair of windings, the inductance value of said windings being chosen relative to any capacitance associated therewith in said network such that said windings are effectively tuned to a frequency sufficiently remote from said predetermined passband that said windings appear as effectively untuned windings with respect to said intermediate frequency signals.

2. Apparatus in accordance with claim 1 wherein said first and second resonant circuits are tuned to respectively different frequencies within a predetermined intermediate frequency passband, and wherein said last-named parallel resonant circuit is tuned to a frequency in the vicinity of the sound carrier intermediate frequency such that at said sound carrier intermediate frequency the output signal component developed between said point on said inductance and said reference potential point substantially equals in amplitude but opposes in phase the output signal component transferred between said input terminal and output terminal by the inductive coupling between said pair of windings.

3. In a signalling system including first and second signal translating devices, apparatus comprising the combination of a tunable output circuit for said first signal translating device; a tunable input circuit for said second signal translating device; a trap network comprising an input terminal, an output terminal, and a common terminal, said common terminal being connected to a point of reference potential; said network having a series signal path including a pair of serially connected, bifilar wound windings connecting said input terminal to said output terminal; said network also having a shunt signal path including an inductance element connecting an intermediate point in said series signal path to said common terminal; means for resonating said inductance element at a frequency related to a predetermined rejection frequency such that at said rejection frequency the signal component developed between said intermediate point and said common terminal substantially equals in amplitude but opposes in phase the signal component developed between said output terminal and said intermediate point means for coupling said input terminal to said tunable output circuit; and means for coupling said output terminal to said tunable input circuit, the inductance value of said windings being chosen relative to any capacitance associated therewith in said network such that said windings are effectively tuned to a frequency sufficiently remote from said predetermined passband that said windings appear as effectively untuned windings with respect to said intermediate frequency signals.

References Cited in the file of this patent

UNITED STATES PATENTS

| | | |
|---|---|---|
| 1,978,475 | Posthumus et al. | Oct. 30, 1934 |
| 2,161,593 | Rust | June 6, 1939 |
| 2,183,741 | Grundmann | Dec. 19, 1939 |
| 2,196,266 | Landon et al. | Apr. 9, 1940 |
| 2,207,796 | Grundmann | July 16, 1940 |

FOREIGN PATENTS

| | | |
|---|---|---|
| 516,252 | Great Britain | Dec. 28, 1939 |

OTHER REFERENCES

Avins: "The Design of IR Amplifiers for Color Television Receivers," IRE Transaction on Broadcast and Television Receivers, July 1954 pages 14–25.